(No Model.)
R. M. HUNTER.
ELECTRIC RAILWAY CONDUIT.
No. 482,964. Patented Sept. 20, 1892.
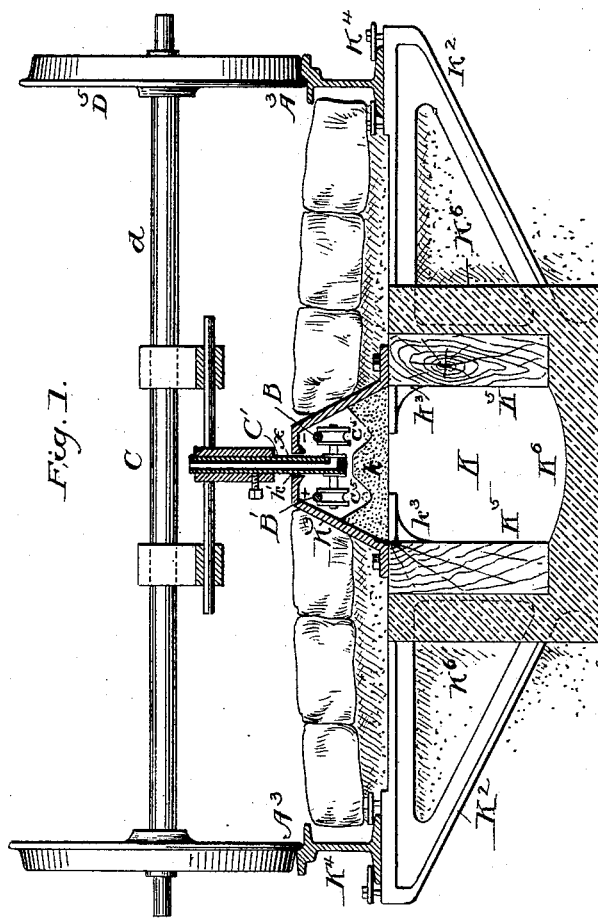
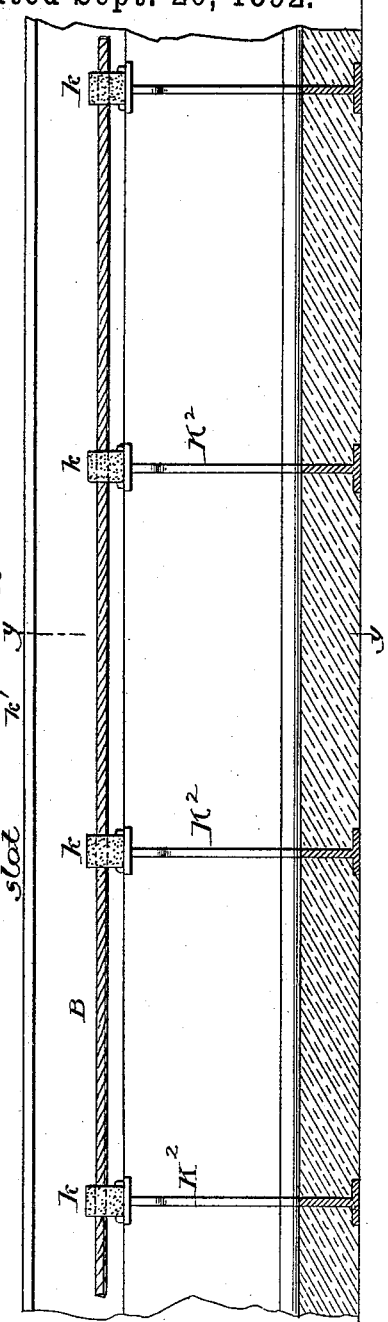
Witnesses:
Inventor:

UNITED STATES PATENT OFFICE.

RUDOLPH M. HUNTER, OF PHILADELPHIA, PENNSYLVANIA, ASSIGNOR, BY MESNE ASSIGNMENTS, TO THE THOMSON-HOUSTON ELECTRIC COMPANY, OF BOSTON, MASSACHUSETTS.

ELECTRIC-RAILWAY CONDUIT.

SPECIFICATION forming part of Letters Patent No. 482,964, dated September 20, 1892.

Original application filed September 23, 1886, Serial No. 214,309. Divided and this application filed June 16, 1888. Serial No. 277,311. (No model.)

*To all whom it may concern:*

Be it known that I, RUDOLPH M. HUNTER, of the city and county of Philadelphia, and State of Pennsylvania, have invented an Improvement in Electric Railways, (Case 67,) of which the following is a specification.

My invention has reference to electric railways; and it consists of certain improvements, all of which are fully set forth in the following specification, and shown in the accompanying drawings, which form part thereof.

My invention has particular reference to slotted conduits for electric railways, and this application (Case 67) is a division of my application, Serial No. 214,309, of September 23, 1886.

Electric railways employing longitudinal conductors have them arranged either above ground, on the surface, or in a conduit, which may be slotted or otherwise. When a slotted conduit is used to contain the conductors, I prefer to form it of two longitudinal compartments, the upper one for the conductors and the lower one for drainage purposes. The construction preferred would be a series of transverse cast-iron brackets, to which the rails are secured and to which top or slot irons are bolted and which form the side walls of the conductor-conduit and have suitable insulation for the support of the conductors, whereby they are held up clear of the drainage-conduit. This would be, in effect, two longitudinal and parallel conduits connected by a narrow passage-way, which admits of cleaning of the lower conduit and the ready flow of dirt and slush from the street, avoiding its accumulation in the upper or electric-conductor conduits. It is immaterial to my invention how the conductors are supported within the conduit or whether they be rigid or flexible, and there may be one or more of such conductors for supplying current to the motor.

In the drawings, Figure 1 is a cross-section of an electric conduit for street-railways on line $y\ y$ of Fig. 2, embodying my invention; and Fig. 2 is a longitudinal section of same on line $x\ x$ of Fig. 1.

A series of cast-iron brackets $K^2$ is arranged parallel along the line of the railway. To these are secured the rails $A^3$ (preferably of the I-beam form) by clamps $K^4$ or otherwise, and along their middles are bolted the slot-irons $K^3$, which are preferably formed obliquely and approach at the top to make the slot $k'$. Immediately below these slot-irons the brackets are made open to form a continuation of the conduit K, and the spaces upon the sides of the conduit between the brackets may be filled in with wood $K^5$, and the bottom and space outside of the planking or wooden sides is filled in with concrete or masonry $K^6$. The upper part of the brackets are also provided with projections $k^3$, upon which the insulating-supports $k$ for the conductors B B' are supported. From this it is seen that the conductors are arranged in the longitudinal passage formed above the brackets and by the slot-irons, constituting, in effect, an electrical conduit, whereas the lower and larger conduit proper K is used only for carrying off dirt, water, and slush, and may connect with the sewer in any of the well-known ways.

C is the vehicle receiving electricity from he conductors housed in the conduit and runs upon wheels $D^5$, having axles $d$, upon which the collector C is hung, with provision for lateral movement to follow the slot of the conduit. The collector may be of any suitable construction and extends down into the conduit through the slot $k$ and makes a sliding or running contact with the conductors B B'. As shown in Fig. 1, this collector has grooved wheels $C^5$, which run under the conductors, lifting them as it passes along. Any other form of collector may be used for the loose or rigid conductors. It is evident that the particular material forming the sides of my conduit structure is immaterial to my invention, broadly considered.

I do not limit myself to the details of construction here shown, as they may be varied in many ways without departing from my invention.

In this application I make no claim to the invention, broadly, of one or more suspended flexible conductors contained within a conduit, nor such invention combined with a laterally-movable current-collector, as that forms subject-matter of my application, (Case 170,) Serial No. 365,962, filed September 24, 1890.

Having now described my invention, what I claim as new, and desire to secure by Letters Patent, is—

1. In an electric railway, the road-bed formed of the main brackets arranged at intervals and to which the rails are secured, in combination with two longitudinal slot-irons bolted to said brackets and forming the side walls of the conductor-conduit, insulated supports secured rigidly with respect to the brackets, working conductors supported by said insulating-supports, a drainage-conduit located below the conductor-conduit and formed of cement or masonry, with plank side walls between the brackets.

2. In an electric railway, a slotted conduit formed with a large drainage compartment or portion along its lower part and having its upper part provided with a longitudinal slot arranged above the drainage compartment or portion and open throughout its length into the drainage-compartment and having a longitudinal electric conductor arranged above the drainage compartment or portion, in combination with a series of deep U-shaped yokes extending from rail to rail below the drainage-compartment, rails and slot-irons supported by said yokes, a vehicle, and a depending current-collecting device extending down through the slot and making a traveling contact with the conductor and guided by the slot-irons.

3. In an electric railway, a slotted conduit formed with a large drainage compartment or portion along its lower part and having its upper part provided with a longitudinal slot arranged above the drainage compartment or portion and open throughout its length into the drainage-compartment and having a longitudinal suspended electric conductor arranged above the drainage compartment or portion, in combination with a series of deep U-shaped yokes extending from rail to rail below the drainage-compartment, rails and slot-irons supported by said yokes, a vehicle, and a depending current-collecting device extending down through the slot and making a traveling contact with the conductor and guided by the slot-irons and having a grooved roller making an underrunning contact with the conductor.

4. In an electric railway, the combination of a series of deep U-shaped yokes arranged transversely to the length of the railway, a deep longitudinal drainage-conduit built along the lower portions of the yokes and sustained thereby, an upper compartment arranged above the drainage-compartment and bounded by slot-irons bolted to the yokes, a longitudinal bared conductor supported and insulated within the conduit above the drainage-compartment, and rails secured to the outer lateral extremities of the yokes.

5. In an electric railway, the combination of a series of deep U-shaped yokes arranged transversely to the length of the railway, a deep longitudinal drainage-conduit built along the lower portions of the yokes and sustained thereby, an upper compartment arranged above the drainage-compartment and bounded by slot-irons bolted to the yokes, a longitudinal bared suspended conductor supported and insulated within the conduit above the drainage-compartment, and rails secured to the outer lateral extremities of the yokes.

6. In an electric railway, a slotted conduit having an upper longitudinal compartment and a lower drainage-compartment opening into each other, in combination with a flexible suspended bared conductor in said upper compartment and insulated supports for said conductor arranged at intervals and protected within the conduit.

7. In an electric railway, the combination of a slotted conduit arranged along the railway, having yokes at intervals and slot-irons secured to the yokes, a conductor loosely supported within the conduit upon transverse insulating-supports sustained in position by the metal work of the yokes and slot-irons, a car or vehicle, and a current-collecting contact carried by the vehicle and making an underrunning contact with the conductor.

8. In an electric railway, a slotted conduit extending along the railway, having an upper electrical compartment and a lower drainage-compartment, a suspended and flexible conductor arranged within the electrical compartment at the upper part of the conduit, a traveling car, and a depending current-collecting device having an underrunning contact moving along the under side of the suspended conductor.

In testimony of which invention I hereunto set my hand.

RUDOLPH M. HUNTER.

Witnesses:
  E. M. BRECKINREED,
  ERNEST HOWARD HUNTER.